United States Patent
Falcoz et al.

(10) Patent No.: US 8,072,677 B2
(45) Date of Patent: Dec. 6, 2011

(54) DEVICE FOR AMPLIFYING A LASER WITH HIGH ENERGY AND HIGH BEAM QUALITY

(75) Inventors: Franck Falcoz, Dourdan (FR); Vincent Moro, Viry Chatillon (FR); Emmanuel Marquis, Bullion (FR)

(73) Assignee: Thales (FR)

( * ) Notice: Subject to any disclaimer, the term of this patent is extended or adjusted under 35 U.S.C. 154(b) by 370 days.

(21) Appl. No.: 11/718,716

(22) PCT Filed: Oct. 26, 2005

(86) PCT No.: PCT/EP2005/055573
§ 371 (c)(1),
(2), (4) Date: May 5, 2007

(87) PCT Pub. No.: WO2006/063901
PCT Pub. Date: Jun. 22, 2006

(65) Prior Publication Data
US 2009/0073550 A1    Mar. 19, 2009

(30) Foreign Application Priority Data
Nov. 5, 2004    (FR) ..................................... 04 11815

(51) Int. Cl.
*H01S 3/00*    (2006.01)
(52) U.S. Cl. ........................ 359/333; 359/342; 372/35
(58) Field of Classification Search .................. 359/333, 359/342; 372/35, 41
See application file for complete search history.

(56) References Cited

U.S. PATENT DOCUMENTS

| | | |
|---|---|---|
| 3,487,330 A | 12/1969 | Gudmundsen |
| 3,611,190 A | 10/1971 | Keefe, Jr. |
| 4,445,217 A | 4/1984 | Acharekar et al. |
| 4,803,439 A | 2/1989 | Ryan et al. |
| 5,272,710 A | 12/1993 | Sumida et al. |

(Continued)

FOREIGN PATENT DOCUMENTS

FR    2 840 61 A    12/2003

(Continued)

OTHER PUBLICATIONS

Dawes J M et al: "Q-switching of a diode-pumped Nd:YAG laser with low uniform gain characteristics" Optics Communications, North-Holland Publishing Co. Amsterdam, NL, vol. 115, No. 5, Apr. 1, 1995, pp. 617-625 XP000491214.

(Continued)

*Primary Examiner* — Mark Hellner
(74) *Attorney, Agent, or Firm* — Lowe Hauptman Ham & Berner, LLP

(57) ABSTRACT

The field of the invention is that of high-energy laser beam amplifiers and associated optical pumping devices. The object of the invention is to use an amplifier configuration and a cooling means which do not have the drawbacks of cryogenic systems that have been used up until now and which however make it possible both to obtain an amplified laser beam of high quality and to minimize transverse lasing effects. A laser beam amplifying device according to the invention combines four main principles, which are use of a crystal exhibiting circular symmetry so as to distribute the mechanical stresses radially; cooling of the entire external surface by a cooling liquid, so as to avoid the use of cryogenic techniques; use of a matching liquid so as to avoid transverse lasing effects; and use of pump laser beams with uniform energy distribution.

6 Claims, 7 Drawing Sheets

U.S. PATENT DOCUMENTS

| | | | |
|---|---|---|---|
| 5,636,239 A | | 6/1997 | Bruesselbach et al. |
| 5,848,081 A | * | 12/1998 | Reed et al. .................... 372/35 |
| 6,009,114 A | | 12/1999 | Heller et al. |
| 6,115,406 A | * | 9/2000 | Mesecher .................... 375/130 |
| 6,532,248 B2 | * | 3/2003 | Tsunekane et al. ............ 372/72 |

FOREIGN PATENT DOCUMENTS

FR            2840461 A1    12/2003

OTHER PUBLICATIONS

Weber R et al: "Cooling Schemes for Longitudinally Diode Laser-Pumped Nd: YAG Rods" IEEE Journal of Quantum Electronics, IEEE Service Center, Piscataway, NJ, JUS, vol. 34, No. 6, Jun. 1998, pp. 1046-1053 XP000765507.

Bibeau C et al: "High-average-power 1-'mu!m performance and frequency conversion of a diode-end-pumped Yb:YAG laser" IEEE Journal of Quantum Electronics IEEE USA, vol. 34, No. 10, Oct. 1998, pp. 2010-2019 XP011052036.

Hoffstaedt A: "Design and performance of a high-average-power flashlamp-pumped Ti:sapphire laser and amplifier" IEEE Journal of Quantum Electronics IEEE USA, vol. 33, No. 10, Oct. 1997, pp. 1850-1863 XP011051743.

"Liquid-Nitrogen Cooled Ti/Sa Laser", Schulz, IEEE Journal of Quantum Electronics, Apr. 1991, vol. 27, No. 4.

"Suppression of Parasitic Lasing in Large Aperture Ti: Sapphire Laser Amplifiers", by Patterson, Bonlie, Price and White, Optics Letters, Jul. 15, 1999, vol. 24, No. 14.

"Thermal Lensing in Nd: YAG Laser Rod", by Koechner, Applied Optics, Nov. 1970, vol. 9, No. 11.

"Principles of Optics", by Born and Wolf, Oxford, Pergamon, 1975, pp. 460-464.

\* cited by examiner

Section AA

DEVICE FOR AMPLIFYING A LASER WITH HIGH ENERGY AND HIGH BEAM QUALITY

CROSS-REFERENCE TO RELATED APPLICATIONS

The present Application is based on International Application No. PCT/EP2005/055573, filed on Oct. 26, 2005 which in turn corresponds to France Application No. 0411815 filed on Nov. 5, 2004 and priority is hereby claimed under 35 USC §119 based on these applications. Each of these applications are hereby incorporated by reference in their entirety into the present application.

The field of the invention is that of high-energy laser beam amplifiers and associated optical pumping devices.

The rise in energy and average power of high-peak-power pulsed lasers of the titanium-doped sapphire type leads to the use of large-diameter amplifying crystals requiring optical pumping energies that may exceed 100 joules per laser shot. The peak power levels of these lasers are generally between 1 terawatt and 1 petawatt.

This rise in energy leads to a substantial increase in average power of the pump lasers, which has the consequence of creating large thermal effects on the amplifying medium. Firstly, the optical index variations due to the thermal effects disturb the propagation of the amplified laser beam, the amplifying medium then behaving as a lens of complex shape. These effects are even more appreciable when the amplified beam generally passes through the amplifying medium several times, thus being degraded at each pass. Secondly, the expansions that are generated induce mechanical stresses on the amplifying medium. Finally, the transverse lasing effect that spontaneously occurs when the energy levels are sufficient is enhanced, this effect considerably reducing the gain of the amplifier. It is therefore necessary to control these undesirable effects in order for the laser chain to operate correctly.

A known technique for combating these effects is the use of cryogenic cooling. Indeed, certain materials, including titanium-doped sapphire crystals, have a thermal conductivity that increases when the temperature decreases. This results in a large reduction in the thermal effects in the amplifying crystal ["*Liquid-nitrogen cooled Ti/Sa laser*", Schulz, IEEE Journal of Quantum Electronics, April 1991, Vol. 27, No. 4]. However, this technique is particularly expensive insofar as it requires substantial equipment, including, in particular, cryogenic fingers, compressors and vacuum pumps.

It also has several major drawbacks:
the use of very low temperatures poses condensation problems;
this type of cooling, generally based on a gas compression/expansion cycle, generates considerable vibration that impairs the stability of the laser;
the systems for holding the crystal on the cryogenic finger may generate high mechanical stresses, which are the origin of additional thermomechanical aberrations; and
for mechanical reasons the crystals subjected to cryogenic temperatures are often parallelepipedal. This results in the appearance of sub-cavities between the opposed faces of the crystals, thus promoting the transverse lasing effect.

The object of the invention is to use an amplifier configuration and a cooling means which do not have the drawbacks of cryogenic systems and which however make it possible both to obtain an amplified laser beam of high quality and to minimize transverse lasing effects.

A laser beam amplifying device according to the invention combines four main principles, which are:
use of a crystal exhibiting circular symmetry so as to distribute the stresses radially;
cooling of the entire external surface by a cooling liquid, so as to avoid the use of cryogenic techniques;
use of pump laser beams with uniform energy distribution; and
use of a matching liquid so as to avoid transverse lasing effects.

This configuration also has the advantage of being able to be used at room temperature.

More precisely, one subject of the invention is a laser beam amplifier comprising an amplifying crystal and means for cooling the crystal, characterized in that:
on the one hand, the crystal has the shape of a right cylinder comprising an entry face and an exit face of circular shape and a cylindrical surface joining said faces, the amplified laser beam circulating between said faces; and
on the other hand, the cooling means are in contact with at least the entire said cylindrical surface.

The invention also relates to a laser beam amplifying device comprising at least one amplifier as described above and an optical pumping device that pumps by at least one pump laser beam passing longitudinally through the amplifying crystal, characterized in that, inside the crystal, the spatial energy distribution within the pump laser beam is constant.

Advantageously, the means for cooling the amplifier comprise a mechanical enclosure surrounding the crystal, a cooling liquid placed between the crystal and the mechanical enclosure, so that the entire cylindrical surface is bathed in the cooling liquid, and means for circulating said cooling liquid in the mechanical enclosure.

Advantageously, the optical index of the cooling liquid is close to that of the crystal so that there is index matching between the cooling liquid and the crystal. By way of example, the cooling liquid may be water in which an additive of ethylene glycol type or any other polymer of suitable index has been added.

Advantageously, the crystal is based on titanium and sapphire.

The invention will be more clearly understood and other advantages will become apparent on reading the following description given by way a nonlimiting example and thanks to the appended figures in which.

Figure 9:
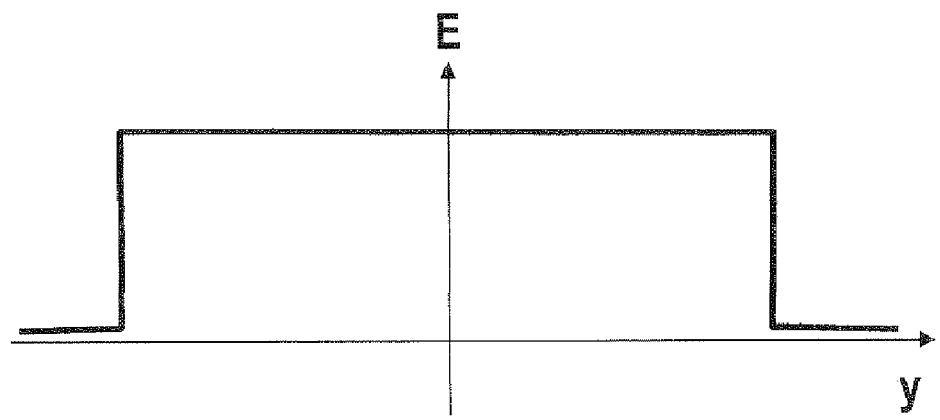
Figure 10:
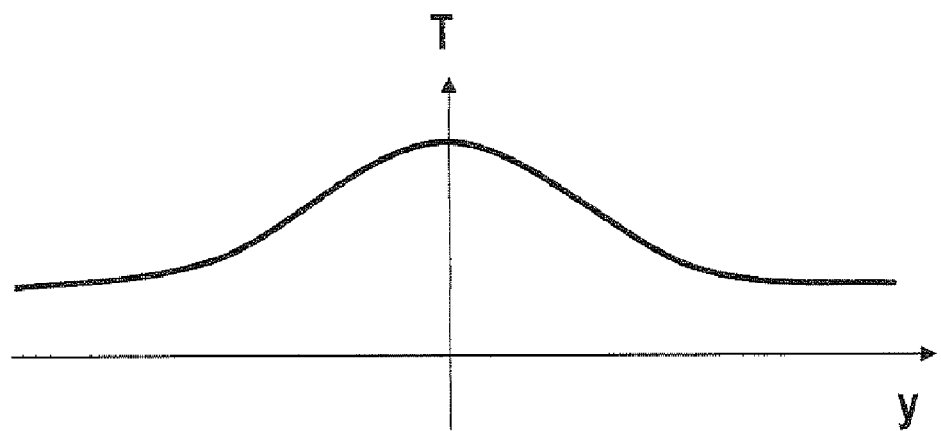
Figure 11:
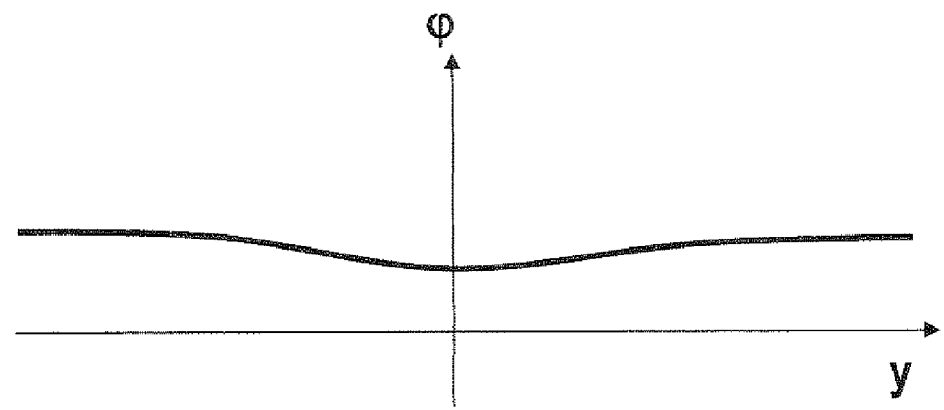
Figure 12:
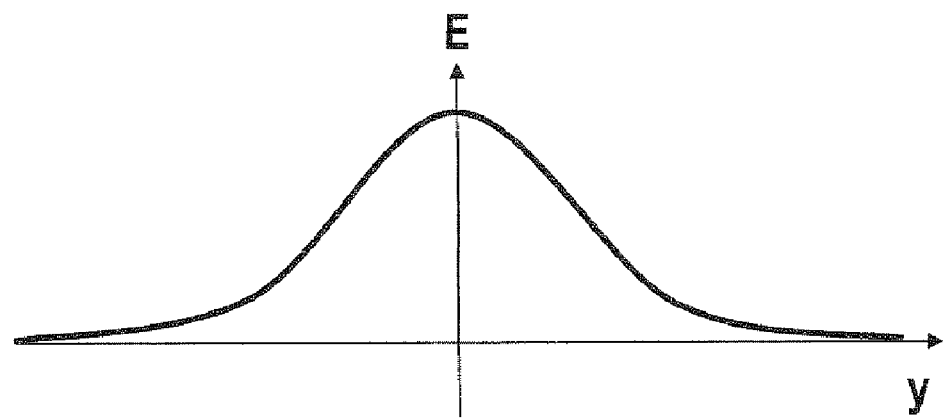
Figure 13:
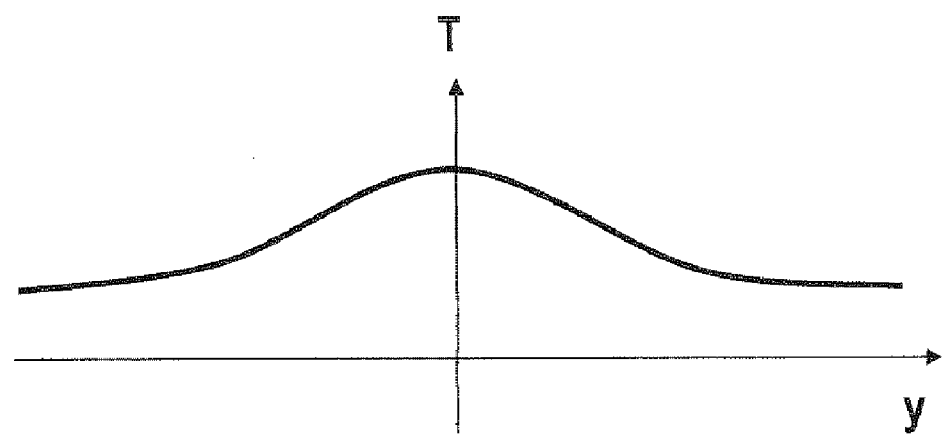
Figure 14:
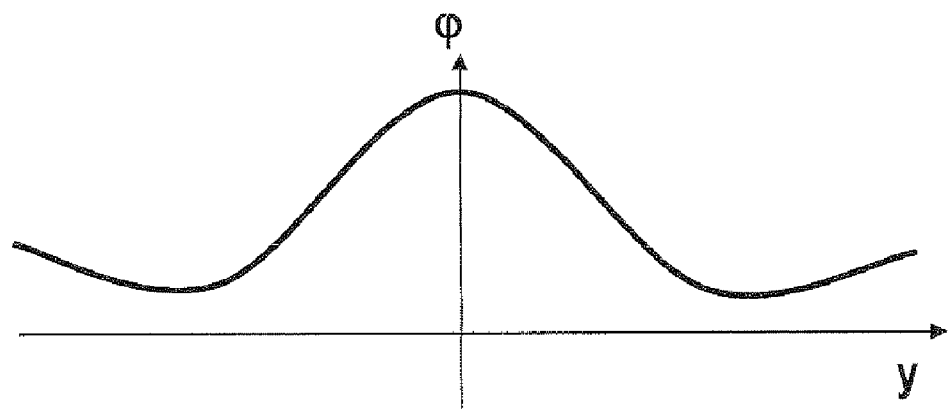

FIGS. 9, 10 and 11 show, respectively, a first energy distribution profile of the pump laser beam according to the invention, the temperature gradient generated in the amplifying crystal and the corresponding phase variation on the emission laser beam; and FIGS. 12, 13 and 14 show, respectively, a second energy distribution profile of the pump laser beam, the temperature gradient generated in the amplifying crystal and the corresponding phase variation on the emission laser beam.

Figure 1:
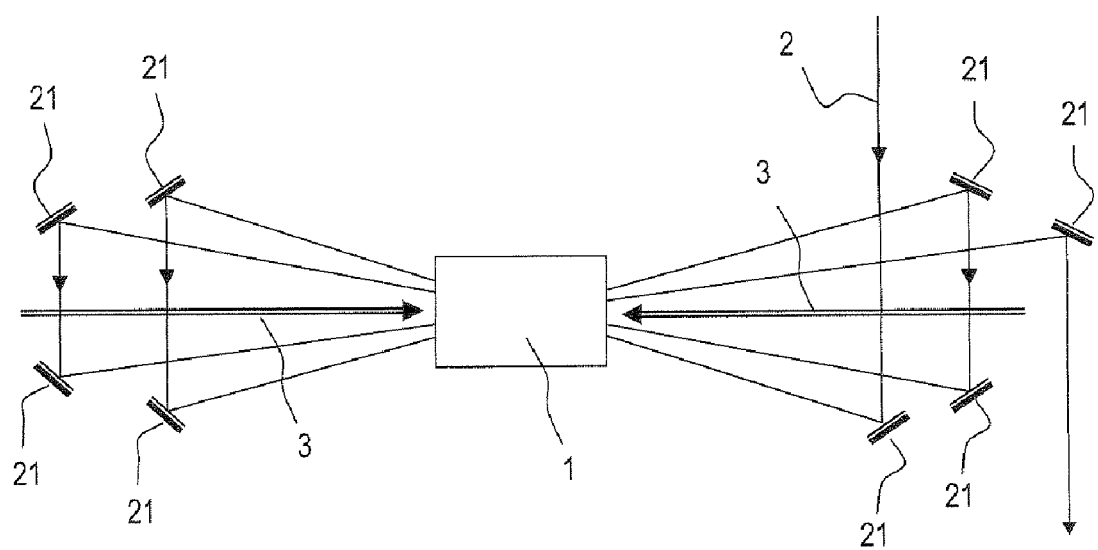
FIG. 1 is a diagram showing the principle of a laser beam amplifying device.

The general operating principle of a laser beam amplifying device is illustrated in FIG. 1. It principally comprises a laser beam amplifier 1 and optical pump laser beams 3. The beams 3 inject optical energy into the crystal of the amplifier. The laser source that originates from the pump beams is not shown in the figure. The laser beam 2 passes through the crystal of the amplifier several times by means of optical mirror devices 21. The beam is amplified in the crystal at each pass. In general, the number of passes is between 2 and 4. In this way the extraction of energy provided by the pump beams 3 is improved.

The output energy $E_{OUT}$ of the laser beam output by the amplifier is given by the Frantz-Nodvik equation. This is:

$$E_{OUT} = J_{SAT} \cdot S \cdot \ln\left[\frac{J_{STO}}{J_{SAT}} \cdot \left(e^{\frac{E_{IN}}{S \cdot J_{SAT}}} - 1\right) + 1\right],$$

where: $E_{IN}$ is the input energy before amplification;
$J_{STO}$ is the stored fluence available for amplification gain;
$J_{SAT}$ is the saturation fluence; and
S is the area of the laser beam.

The input fluence before amplification $J_{IN}$ is also given by:

$$J_{IN} = \frac{E_{IN}}{S}.$$

When $J_{IN}$ is very much less than $J_{SAT}$, the Frantz-Nodvik equation is simplified. In this case, the value of the amplification gain G, which is equal to the ratio of the output energy $E_{OUT}$ to the input energy before amplification $E_{IN}$, is given by:

$$G = e^{\frac{J_{STO}}{J_{SAT}}}.$$

Figure 2:
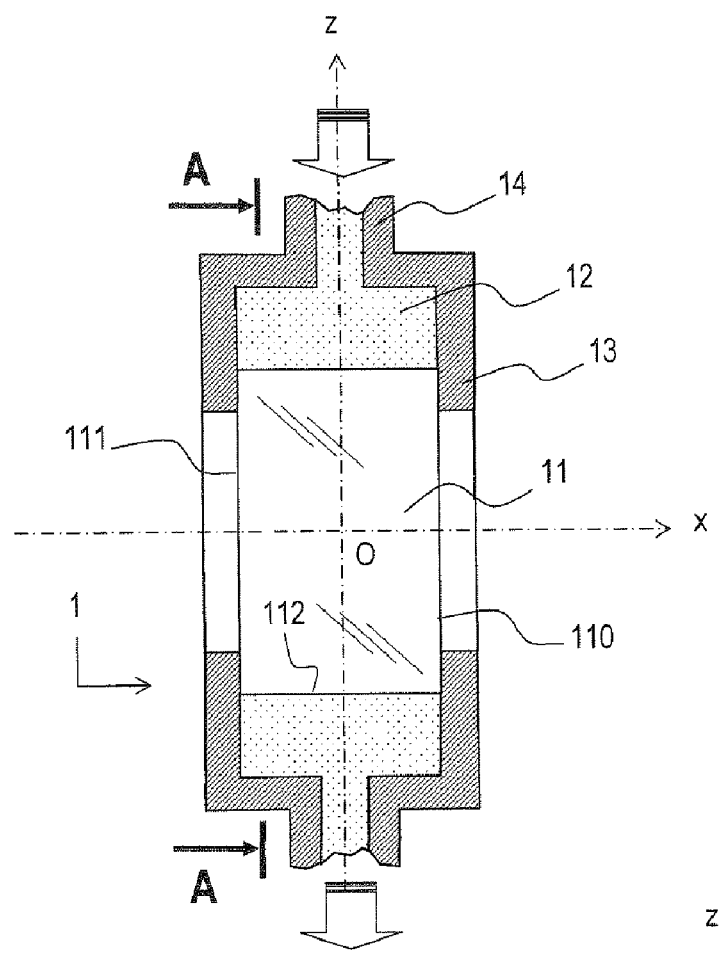
FIGS. 2 and 3 show two sectional views of an amplifier according to the invention.
Figure 3:
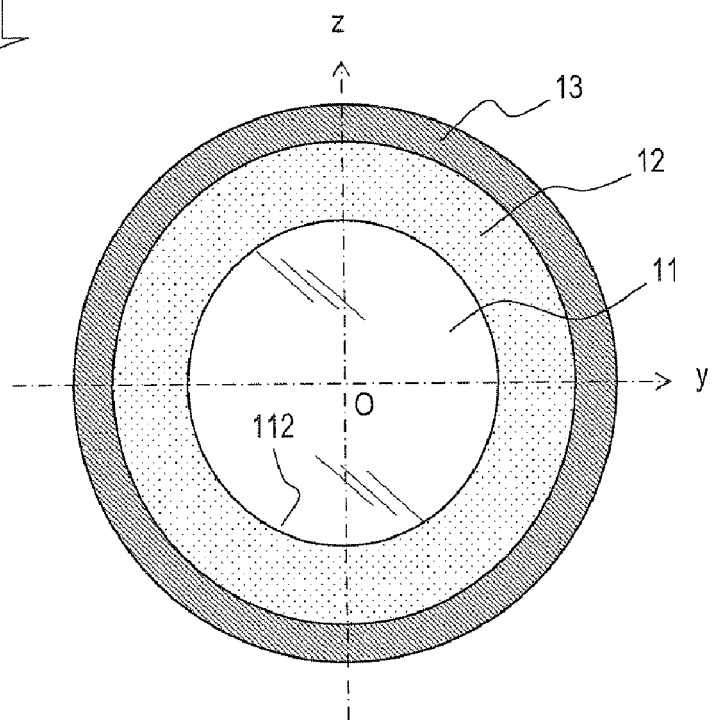

As a nonlimiting example, FIGS. 2 and 3 show a laser amplifier according to the invention. The amplifier is referenced in an orthonormal reference (O,x,y,z) common to all the figures. FIG. 2 shows a first sectional view in a plane (O,x,z) and FIG. 3 a second sectional view in a perpendicular plane (O,y,z).

It principally comprises:
an amplifying crystal 11 having the form of a right cylinder, comprising an entry face 110 and an exit face 111 of circular shape and a cylindrical surface 112 joining said faces 110 and 111, the amplified laser beam circulating between said faces;
a mechanical enclosure 13 surrounding the crystal 11. As may be seen in FIG. 2, the mechanical enclosure must be configured so that the entry and exit faces 110 and 111 of the amplifying crystal are left substantially free so that the diameter of a laser beam passing through the crystal can be as large as possible;
a cooling liquid 12 placed between the crystal 11 and the mechanical enclosure 13 so that the entire cylindrical surface 112 is bathed in the cooling liquid, as may be seen in FIGS. 2 and 3; and
means 14 for circulating said cooling liquid in the mechanical enclosure. The circulation of the liquid is shown symbolically in FIG. 2 by two barred broad arrows.

The material of the amplifying crystal is a material capable of optical pumping. Typically, it consists of titanium and sapphire.

Figure 4:
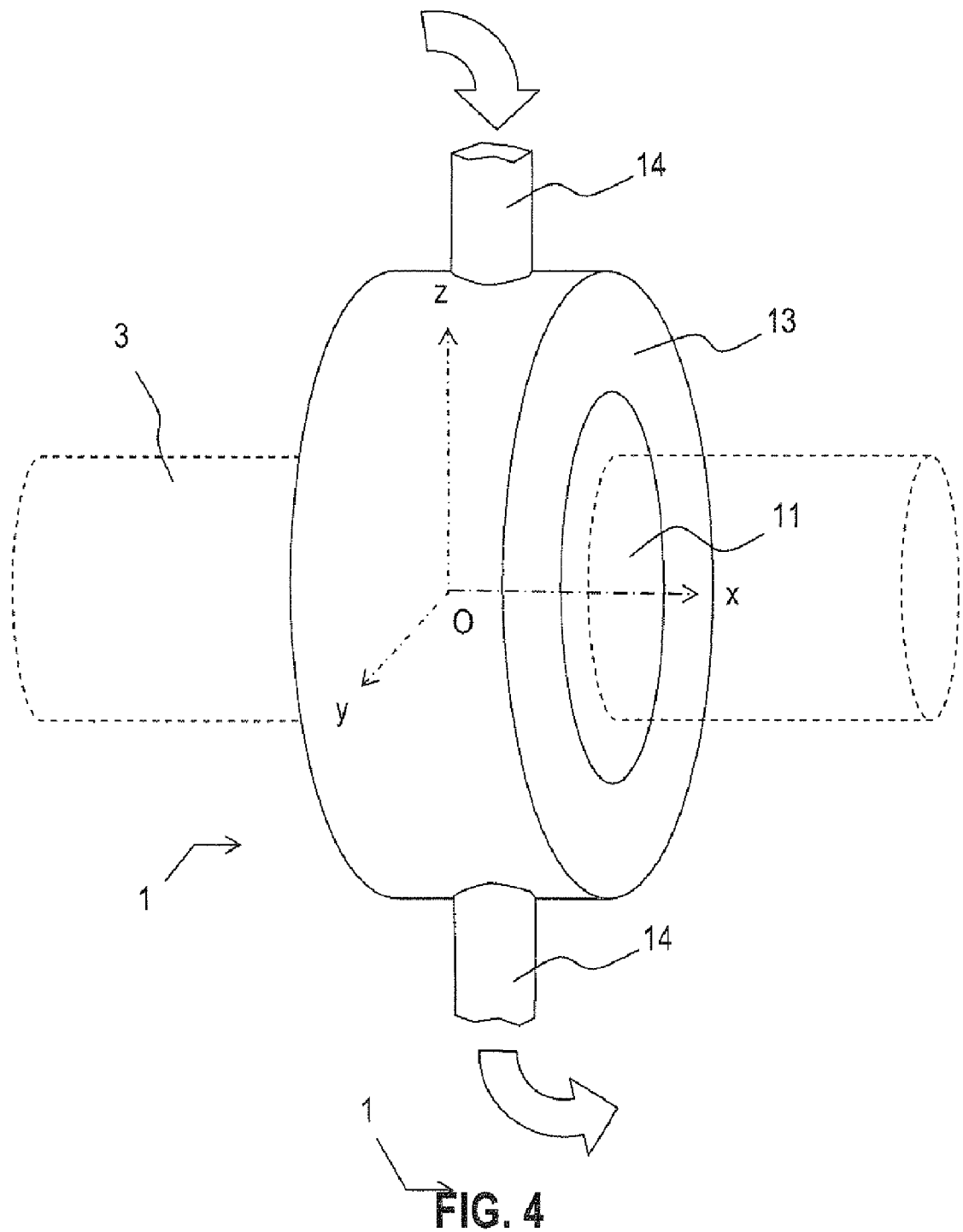
FIG. 4 shows a three-dimensional view of the amplifier according to the invention.

FIG. 4 shows a laser beam amplifying device comprising at least one amplifier 1 according to the invention. The device essentially comprises:
an amplifier 1 comprising, as above, an amplifying crystal 11, a mechanical enclosure 13 and a cooling liquid 12; and
means for generating pump laser beams 3 (only the pump beams 3 are shown dotted in FIG. 4).

Preferably, the crystal is pumped longitudinally, that is to say the propagation of the pump beams takes place in a direction approximately parallel to the generatrix of the cylinder constituting the crystal. Of course, the pump beam has a circular shape so as to be well matched to the shape of the crystal. In addition, the energy distribution within the pump laser beam is constant.

These various arrangements allow the main drawbacks associated with the use of high-energy pump beams to be substantially reduced. These drawbacks are mainly:
appearance of transverse lasing effects;
degradation of the amplified laser beam quality;
appearance of mechanical stresses on the crystal.

In theory, the lasing effect appears spontaneously between two regions of the surface or of the periphery joining the entry and exit faces of the crystal when the following condition is met:

$G_T R_T > 1$, where $G_T$ is the transverse gain of the amplifying crystal and $R_T$ is the optical reflection coefficient at the interface separating the periphery of the crystal from the outside.

In practice, the transverse lasing effect appears for:

$G_T R_T > 0.2$.

It can be demonstrated that $G_T$ is given by:

$G_T = e^{g_o \phi_P}$, where $g_o$ is the linear gain of the amplifying crystal and $\phi_P$ is the diameter of the pump laser beam.

The value of $g_o$ is also given by:

$$g_o = \frac{J_{STO}}{l \cdot J_{SAT}} = \frac{E_{STO}}{l \cdot S \cdot J_{SAT}},$$

where $E_{STO}$ is the available stored energy for amplification gain and S is the area of the pump laser beam.

It can also be demonstrated that:

$$E_{STO} = E_{PUMP} \cdot \alpha \cdot l \cdot \frac{\lambda_{pump}}{\lambda_{laser}},$$

where $E_{PUMP}$ is the energy provided by the pump laser, $\alpha$ is the linear absorption coefficient of the pump laser, l is the length of the pumped crystal and $\lambda_{PUMP}$ et $\lambda_{LASER}$ are the wavelengths of the pump laser beam and the amplified laser beam respectively, the ratio of these wavelengths corresponding to quantum efficiency of the amplifying crystal. For example, for a titanium-doped sapphire crystal, the pump beam of which is with a wavelength $\lambda_{PUMP}$ of 532 nanometers and the amplified laser beam of which has a wavelength $\lambda_{LASER}$ of 800 nanometers, the quantum efficiency is equal to 0.665.

The stored energy $E_{STO}$ is not uniform along the crystal. It may be demonstrated that the absorbed energy variation $E_{ABS}$ (x) along the crystal in the Ox direction is given by:

$$E_{ABS}(x)=(1-e^{-\alpha_x x}).$$

Figure 5:
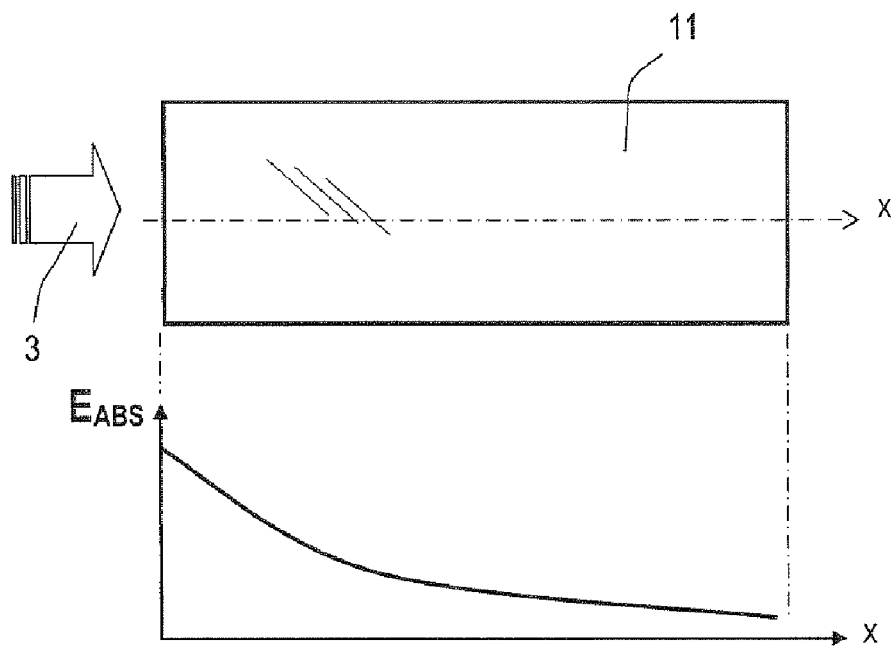
FIGS. 5 and 6 show the variation in energy absorbed by the amplifying crystal along its axis.
Figure 6:
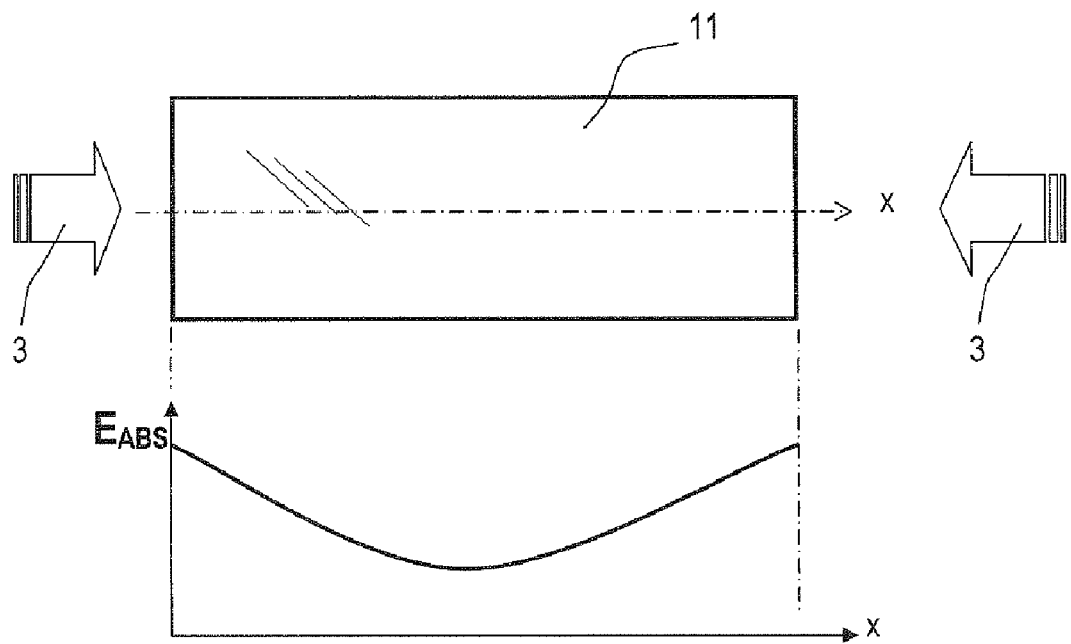

FIGS. 5 and 6 show the variation in absorbed energy $E_{ABS}$. In FIG. 5, only one pump beam passes through the crystal. In this case, the absorbed energy distribution constantly decreases from one end of the crystal to the other. In FIG. 6, two opposed pump beams pass through the crystal. In this case, of course, the absorbed energy distribution is symmetrical and the energy variations are attenuated. However, the ends of the crystal still contain more absorbed energy than its central part. Consequently, the transverse gain $G_T$ is larger at the ends of the crystal than at its center, thus promoting transverse lasing effects in the end parts of the crystal close to the entry and exit faces.

Conventionally, $R_T$ is given by:

$$R_T = \left[\frac{\Delta n}{\Sigma n}\right]^2$$

where: $\Delta n$ is the difference between the optical index of the crystal and the optical index of the external medium; and $\Sigma n$ is the sum of the optical indeces of the crystal and the external medium.

To minimize the transverse lasing effect, it is therefore necessary to reduce $R_T$. For example, it is possible to deluster the periphery of the crystal in order to reduce the reflection coefficient ["*Suppression of parasitic lasing in large aperture Ti: sapphire laser amplifiers*", by Patterson, Bonlie, Price and White, Optics Letters, Jul. 15, 1999, Vol. 24, No. 14]. Thus, in the case of a titanium-doped sapphire crystal, the reflection coefficient at the crystal/air interface is only 1.1% when the crystal is delustered, whereas it is 7.5% when the crystal is polished.

Figure 7:
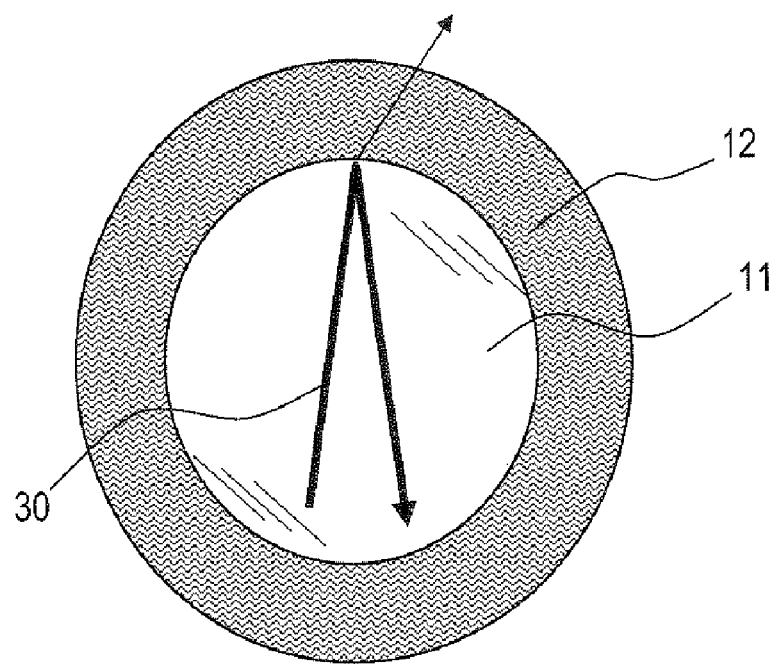
FIGS. 7 and 8 show the effect of index matching on the transverse lasing effect.
Figure 8:
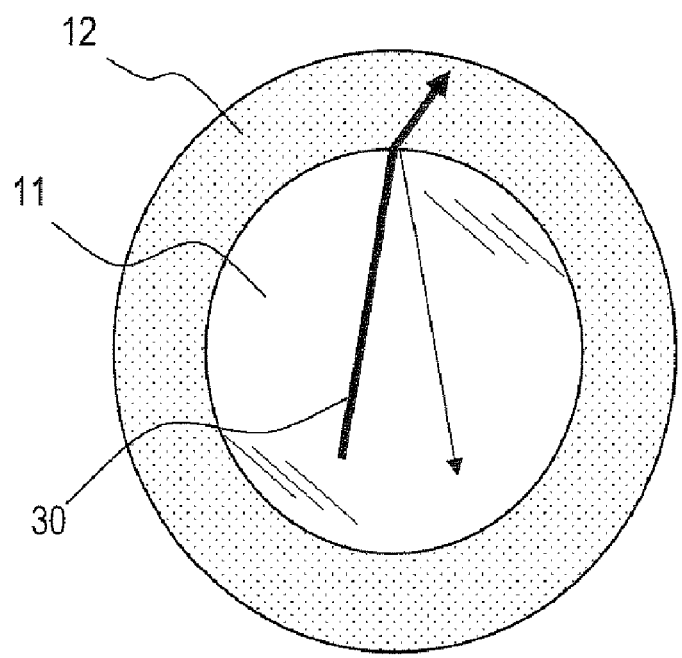

It is also possible to reduce $R_T$ by matching the optical index of the crystal to that of the material surrounding it. FIGS. 7 and 8 illustrate this principle. In the case of FIG. 7, the optical index of the medium 12 surrounding the crystal 11 is very different from that of the crystal, the reflection of the light ray 30 (shown symbolically by an arrow) off the wall of the crystal is substantial, and the transverse lasing effect can occur. In the case of FIG. 8, the optical index of the medium 12 surrounding the crystal 11 is close to that of the crystal, the reflection of the light ray 30 off the wall of the crystal is slight, and the transverse lasing effect cannot occur. In practice, it is possible to use solid polymers having an optical index close to that of the crystal. Very good index matching is thus obtained, the reflection coefficient then being only 0.05% with a 1.68 index polymer surrounding a titanium-doped sapphire crystal, the optical index of which is close to 1.76 at the operating wavelength. Unfortunately, this solution is not favorable thermally since the polymers used are poor heat conductors.

In the devices according to the invention, it is easy to achieve index matching using a cooling liquid whose optical index is close to that of the amplifying crystal. Thus, in the case of a titanium-doped sapphire crystal, if water is used as cooling liquid, the optical index of which is about 1.3, the coefficient $R_T$ is 2.3% when the crystal is polished and 0.3% if the crystal is delustered. $R_T$ can also be reduced by using water containing an additive such as ethylene glycol—the optical index of the mixture is then 1.4 and the coefficient $R_T$ is now only 1.3% when the crystal is polished and 0.2% if the crystal is delustered.

In addition, since it has been seen that the transverse lasing effect is promoted at the ends of the crystal, it is therefore important for the ends of the crystal to be bathed in the cooling liquid that provides optical index matching.

The quality of the amplified laser beam depends essentially on the quality of the pump beam, which must not induce a thermal gradient within the amplifying crystal liable to disturb the wavefront of the amplified laser beam. The quality is characterized by its Strehl ratio. In general, it is estimated that a high-quality beam must have a Strehl ratio of greater than 0.9.

In the case of a cylindrical crystal pumped along the axis, the profile of the energy distribution E of the pump beam must be constant as indicated in FIG. 9, which shows the energy distribution E along a y-axis perpendicular to the direction of propagation of the pump beam. The laser beams are then said to be of "flat top" type. The thermal deposition in the crystal is then homogeneous and results in a parabolic temperature profile as indicated in FIG. 10, which shows the variation in temperature T within the crystal along a y-axis perpendicular to the axis of symmetry of the crystal. Typically, the temperature variations are around ten degrees with crystals having a diameter of a few centimeters. This profile therefore creates a pure thermal lens, the focal length at $f_{th}$ of which is expressed by the classical formula ["*Thermal lensing in Nd:YAG laser rod*", by Koechner, Applied Optics, November 1970, Vol. 9, No. 11]:

$$fth = \frac{2\pi r^2 \lambda}{p_T\left[\frac{dn}{dT}\right]}$$

where: r is the radius of the pump beam;

$\lambda$ is the wavelength of the amplified laser beam;

$p_T$ is the thermal power deposited in the crystal; and $$\frac{dn}{dT}$$

is the index gradient of the material as a function of temperature.

Typically, the thermal lenses have focal lengths ranging from a few tens of centimeters to a few tens of meters.

In this case, it can be demonstrated that the residual phase variations of the amplified laser beam, after focal length correction, are very small, as illustrated in FIG. 11 in which phase variations $\phi$ of the laser beam are shown along the y-axis of the crystal. Typically, very good Strehl ratios of greater than 0.99 are thus obtained.

It should also be noted that this configuration is quite sensitive to the energy micromodulations which induce slight modulations in the parabolic temperature profile and slightly degrade the quality of the amplified beam. Thus, energy modulations of 10% still allow Strehl ratios of greater than 0.98 to be obtained.

When the pump beam is no longer homogeneous, the temperature profile is no longer parabolic. The index variation induced by the temperature profile creates optical path differences W(r) in the form:

$$W(r) = n_o \cdot l + \frac{dn}{dT}\bigg|_T \int_o^l T(r,x) dx$$

where: $n_o$ is the average optical index of the crystal;

l is the length of the crystal; and

T(r,x) is the temperature distribution along a first axis, x, which is the axis of symmetry of the crystal, and a radial second axis, r, which is perpendicular to the x-axis.

The distortion of the wavefront WFE(r) is given by the expression:

$$WFE(r) = \frac{W(r) - W(o)}{\lambda},$$

where: W(o) is the path at the centre of the rod; and

W(r) is the axial path of the ray r.

["*Liquid-nitrogen cooled Ti: Sa laser*" by Schulz, IEEE Journal of Quantum Electronics, April 1991, Vol. 27, No. 4]

The induced degradation of the Strehl ratio SR is then estimated using the Maréchal approximation ["*Principles of optics*", by Born and Wolf, Oxford, Pergamon, 1975, pp 460-464]. This is expressed as:

$$RS = e^{-(2\pi WFE_{rms})^2}.$$

FIGS. 12, 13 and 14 show the variations in the profile of the energy distribution E of the pump beam, the temperature variation within the crystal and the phase variation when the energy distribution E is no longer constant, but Gaussian. It may be seen that phase variations as illustrated in FIG. 14 are considerably greater than those illustrated in FIG. 11. The Strehl ratio is now only 0.5, which is insufficient to ensure correct propagation of the beams.

The use of a crystal exhibiting radial symmetry also allows the stresses to be radially distributed, thus reducing the stresses on the structure.

The invention claimed is:

1. A laser beam amplifier comprising:

an amplifying crystal, means for cooling the amplifying crystal, and an optical pumping device that pumps by at least one pump laser beam, wherein the amplifying crystal has a shape of a right cylinder comprising an entry face and an exit face of circular shape and a cylindrical surface joining said faces, an amplified laser beam circulating between said faces;

the cooling means are in contact with the an entirety of said cylindrical surface, the cooling means selected to index match with the amplifying crystal; and the at least one pump laser beam passing longitudinally through the amplifying crystal, and inside the amplifying crystal, an energy distribution within the at least one pump laser beam is substantially constant.

2. The laser beam amplifier as claimed in claim 1, wherein the cooling means comprise a mechanical enclosure surrounding the amplifying crystal, a cooling liquid placed between the amplifying crystal and the mechanical enclosure so that the entirety of the cylindrical surface is bathed in the cooling liquid, and means for circulating said cooling liquid in the mechanical enclosure.

3. The laser beam amplifier as claimed in claim 2, wherein the cooling liquid is water in which an additive of ethylene glycol type has been added.

4. The laser beam amplifier as claimed in claim 1, wherein the amplifying crystal is based on titanium and sapphire.

5. The laser beam amplifier as claimed in claim 2, wherein the amplifying crystal is based on titanium and sapphire.

6. The laser beam amplifier as claimed in claim 3, wherein the amplifying crystal is based on titanium and sapphire.

\* \* \* \* \*